May 26, 1970     R. P. BORKOWSKI ET AL     3,514,609
LIGHT SOURCE TRACKING APPARATUS BY LIGHT STANDARD COMPARISON
Filed Oct. 13, 1967     4 Sheets-Sheet 3

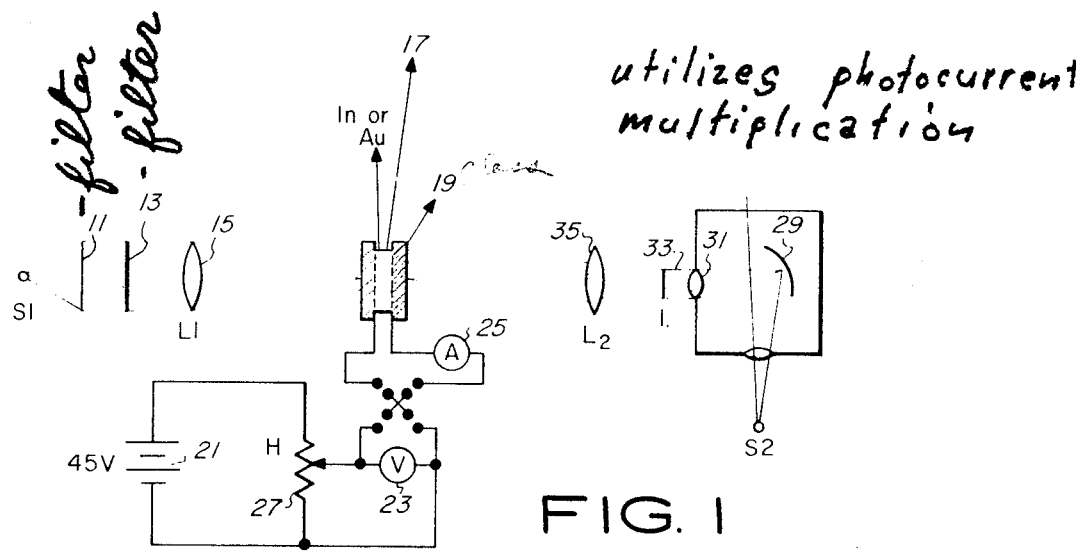
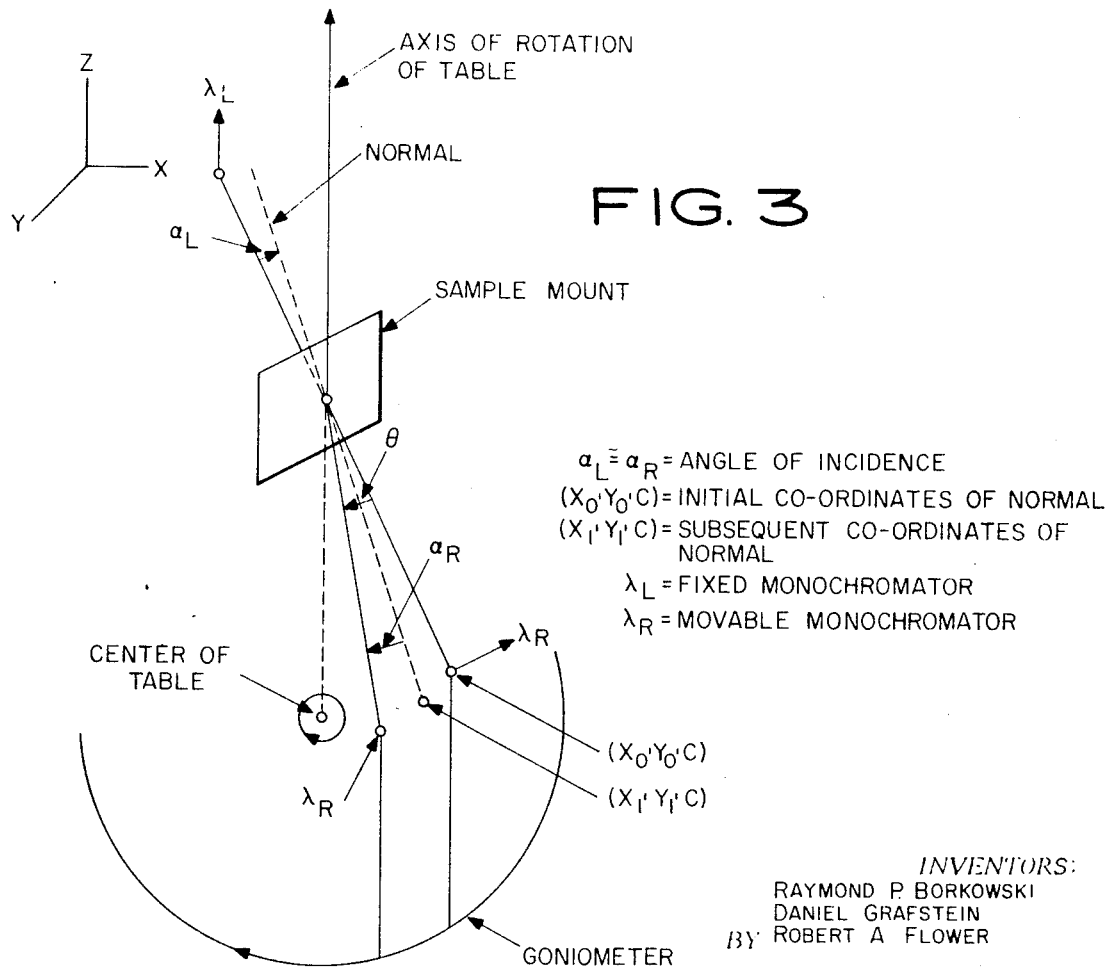

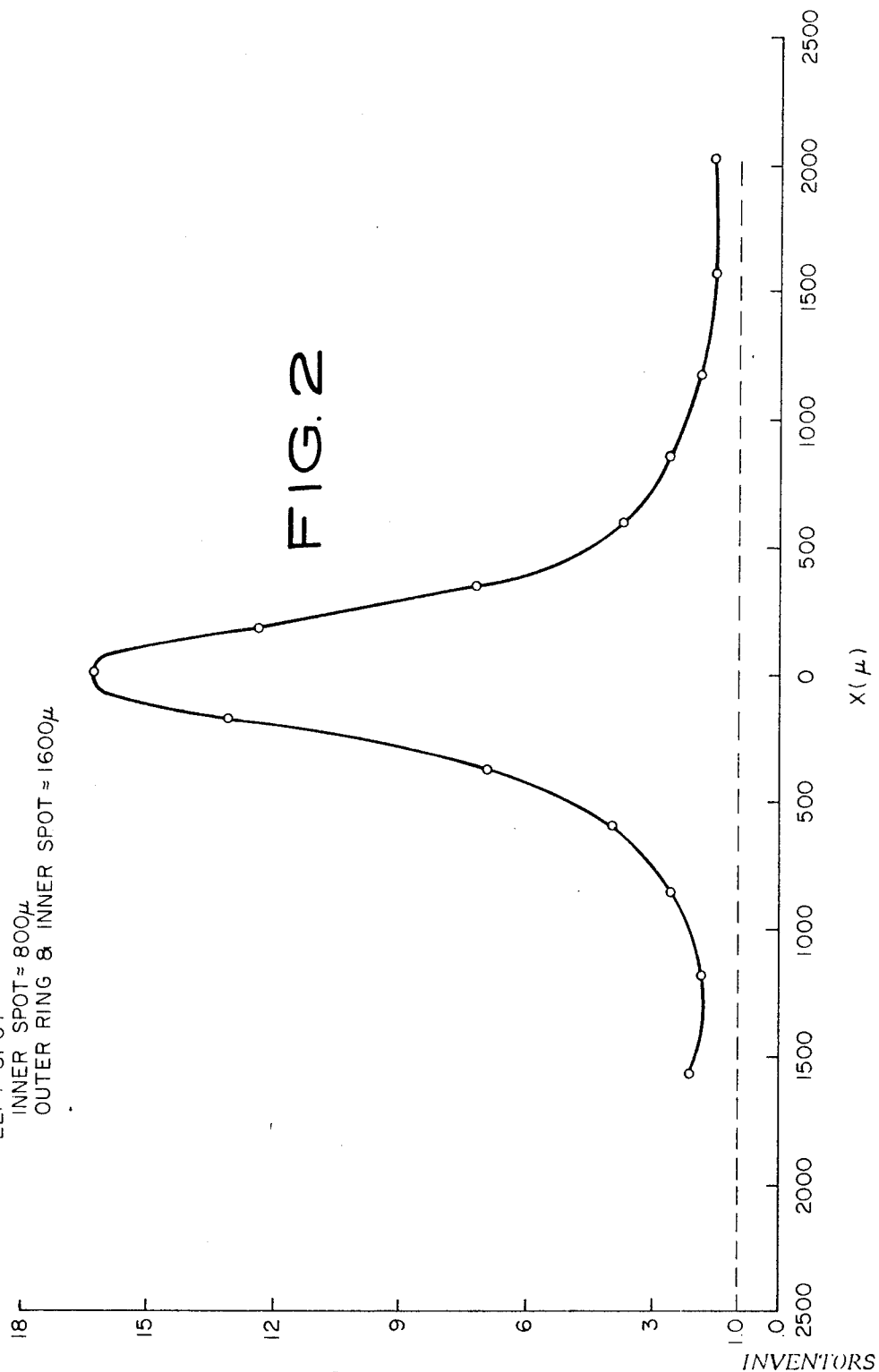

INVENTORS
RAYMOND P. BORKOWSKI
DANIEL GRAFSTEIN
BY ROBERT A. FLOWER

ATTORNEY

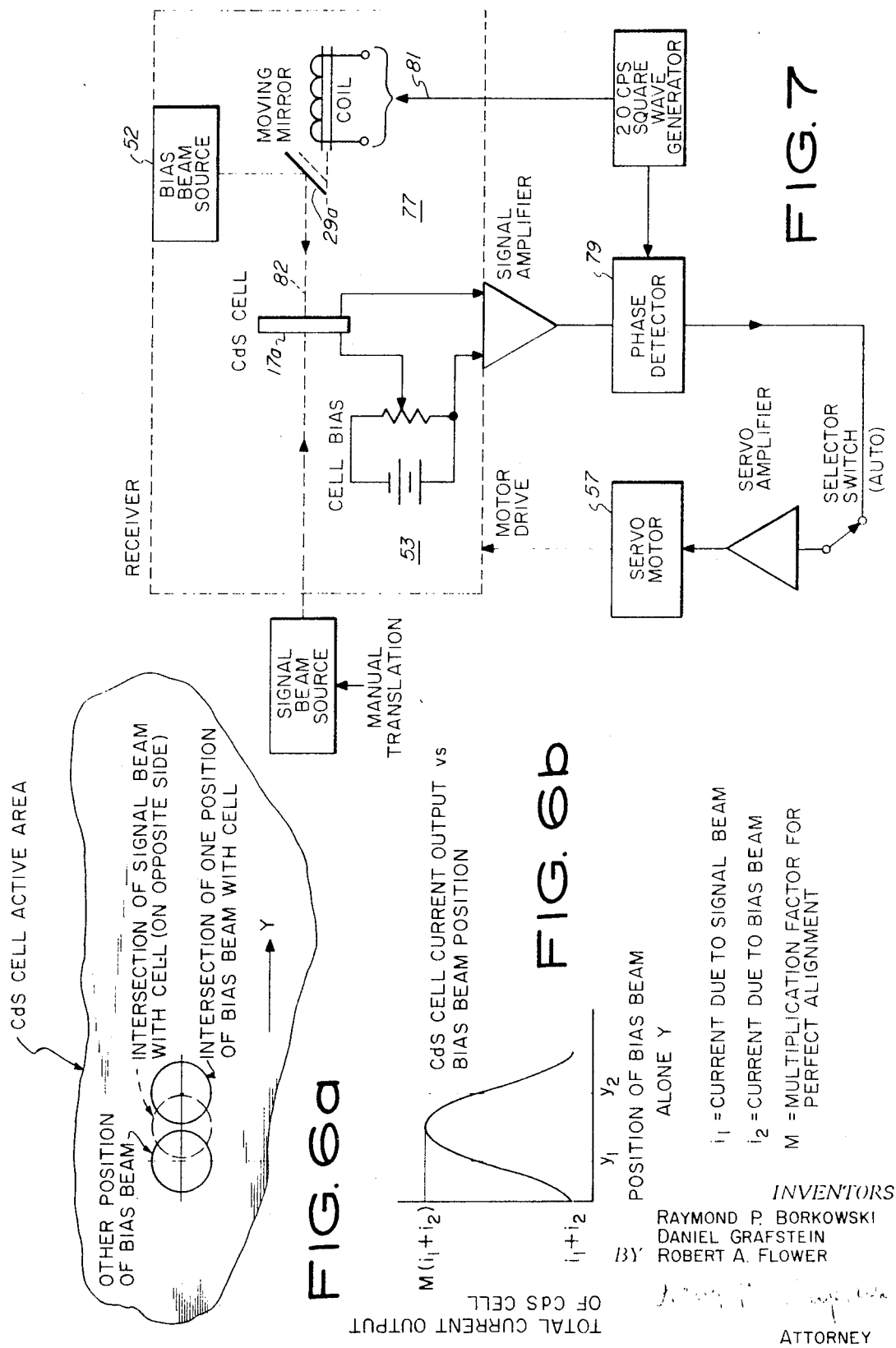

United States Patent Office 3,514,609
Patented May 26, 1970

3,514,609
LIGHT SOURCE TRACKING APPARATUS BY LIGHT STANDARD COMPARISON
Raymond P. Borkowski, Dallas, Pa., Daniel Grafstein, Morristown, N.J., and Robert A. Flower, White Plains, N.Y., assignors to Singer-General Precision, Inc., a corporation of Delaware
Filed Oct. 13, 1967, Ser. No. 675,231
Int. Cl. G01b 11/27; G01j 1/10; H01j 39/12
U.S. Cl. 250—203      3 Claims

ABSTRACT OF THE DISCLOSURE

A beam tracking device, comprising in combination, optics receiver means including means for gathering and focusing energy as a beam, e.g. star energy, laser beam, etc. a flat photocell disposed to receive said energy focused as a spot on one side thereof including cell electrical bias means and an output line; an internal beam source in said device producing a beam which is to be focused on the other side of said photocell as a spot; scanning means including a mirror and means for moving said mirror in a scan pattern disposed for moving said internal beam spot on said other side of the photocell in the scan pattern; and, a servo means connected to said output line including means to detect the coincidence of said energy beam spot and said internal beam spot by the current multiplication effect output caused thereby including moving means to move said device so that said internal beam spot seeks to maintain coincidence with said energy beam spot.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The present invention relates to a beam tracking and to a beam alignment arrangement useful in communications and in navigation and guidance.

For example, in the navigation and guidance of space vehicles and missiles, particularly over relatively short distances, it is often necessary to direct the navigational system optics section at some star. The problem is often twofold: first to seek out the star and second, to track it so as to control the attitude of the vehicle or missile in a certain orientation with respect to a star. Since a beam can be generated within the optics section, and the star energy passing through the optics section can be focused as a beam, the problem may be restated as requiring a device which is to align two narrow light beams automatically so that each is coincident with one another and to "lock" the two beams in coincidence in case one of the light beams is moving with respect to the other. In the former situation the device would be acting as a beam aligner while in the latter situation it is acting as a beam follower or beam tracker. Also, in ship to ship communication using a modulated light beam, the same problem will also arise.

It must be pointed out that the two beams need not form a straight line. On the contrary, the problem is simply to focus the beam energy on a detector as a spot and to track the spot with a beam generated internally. The problem of measuring the angle between the two beams and if necessary to keep these beams in a straight line, if that is what is desired is quite another story which is accomplished by instruments and systems quite different from those herein described.

Figure 4:
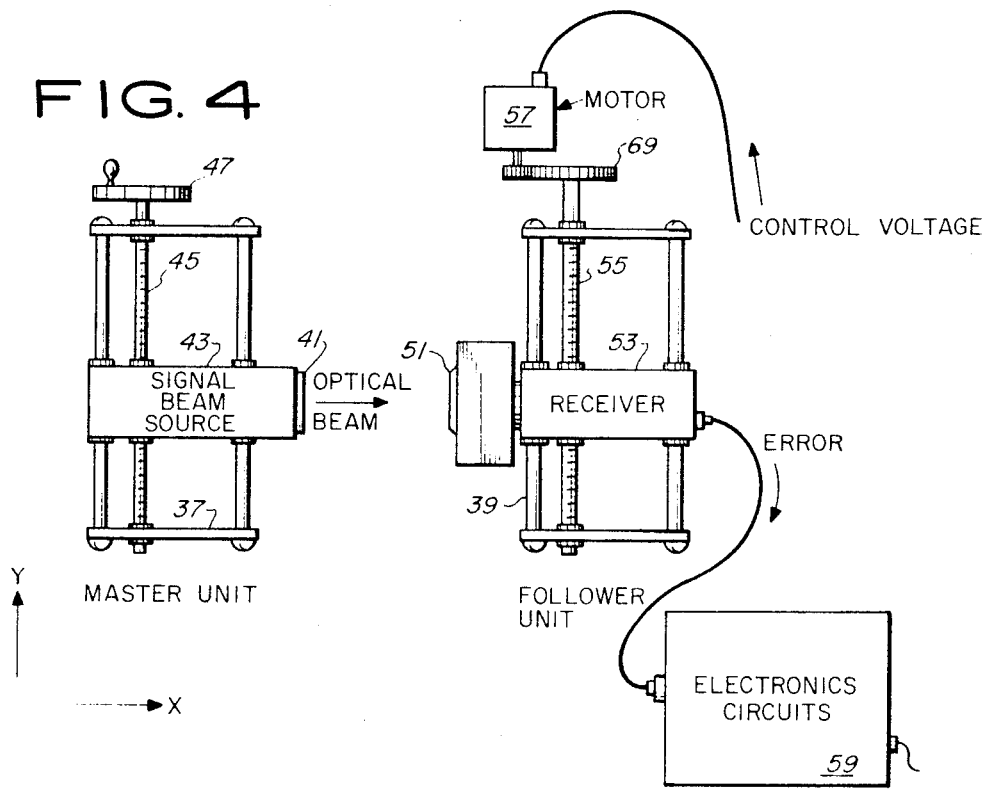
Figure 5:
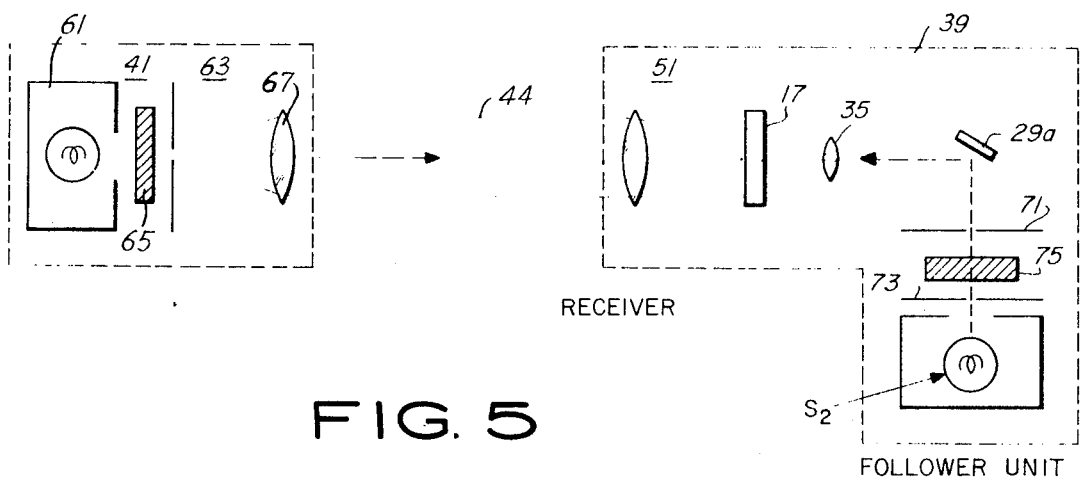

The invention as well as other objects and advantages thereof will be better understood from the following detailed description when taken in conjunction with the accompanying drawing in which:

FIG. 1 is a schematic representation of some of the inventive concepts used herein;
FIG. 2 presents in graphic form some of the results obtained using the present inventive concept;
FIG. 3 is another schematic representation of some of the inventive concepts;
FIG. 4 depicts a top view of a simplified version of the inventive concept;
FIG. 5 is another partly schematic explanation of the inventive concept;
FIG. 6a is a simple sketch of the overlapping of two beam spots;
FIG. 6b is the graphic output resulting from the overlapping of the two beam spots shown in FIG. 6a; and
FIG. 7 is yet another schematic explanation of the inventive concept.

In carrying the present invention into practice, use is made of the current multiplication effect. This effect is briefly touched upon in the R. Willes et al. U.S. patent application, Ser. No. 42,842, filed July 14, 1960. This patent application merely mentions the coincidence of two beams on opposite sides of a photocell. However, subsequent investigation of this effect reveals a phenomenon herein described and better explained as a "multiplication" effect.

If a light spot from source $S_1$, is incident on one surface of a sandwich type photocell which under the application of a bias voltage produces a photocurrent, $i_1$, and likewise a light spot emanating from source, $S_2$, incident on the opposite surface of a photocell, produces a photocurrent, $i_2$; then, when both light spots are simultaneously illuminating opposite surfaces of the photocell, a photocurrent, $i_{1+2}$ is produced which varies in magnitude from the sum of the two photocurrents ($i_1+i_2$) to values much greater than this sum, depending on the relative positions of the two spots to each other. When both spots are coincident a photocurrent, $i_{1+2}$, which is usually much greater than the sum of the photocurrent ($i_1+i_2$), is produced. This we have called the current multiplication effect. It can be summarized by the equation:

$$i_1{}^+{}_2 = M(i_1+i_2)$$

The proportionality factor, M, is defined as the multiplication factor and usually has values greater than unity when both beams are coincident. The value of M approaches unity as both beams are moved apart from each other—that is directed to different areas on the opposite surfaces. The current multiplication effect only occurs when opposite surfaces of the photoconductor are illuminated. When two light spots are directed simultaneously to the same area on the same surface an additivity of the individual photocurrents occurs. Thus, for dual spot illumination of the same surface, one is unable to distinguish between the situation where both spots are illuminating the same area and the situation where different areas are being illuminated.

The multiplication effect may perhaps best be illustrated by the arrangement shown in FIG. 1 showing light sources $S_1$ and $S_2$. Light from source $S_1$ passes through filters 11 and 13 through condensing lens 15 onto a doped polycrystalline cadmium sulfide cell 17 sandwiched between plates of glass 19. The voltage and amperage are measured by appropriate instruments e.g., a voltmeter 23 and ammeter 25 and adjusted by a potentiometer 27. Light from source $S_2$ is likewise directed towards cell 17 by means of concave mirror 29 first lens 31 filter 33 and second lens 35.

One spot of radius 0.4 mm. and one spot of radius 0.2 mm. were employed. In order to carry out these experiments, the light spots first had to be made to coincide precisely. To accomplish this, a frosted glass plate was inserted in the path of the light beams emanating from each monochromator. Each beam was focused onto the glass plate by means of a microscope objective-eyepiece lens combination. The two beams were visually centered as well as possible. The use of an auxiliary magnifying lens made it possible to secure complete overlap of the two light spots. After the two light spots were made to coincide, the photoconductive cell 17 in an appropriate holder was inserted in place of the frosted glass plate and the proportionality factor M was determined for various positions of the moving beam.

The displacement of one of the light spots was effected by inserting a glass plate of 3.0 mm. thickness in the path of the beam. As long as the glass plate is normal to the beam, there is no displacement. When the plate is rotated by an angle $\alpha$, the beam is displaced, without change of direction, by a distance X:

$$X = d \sin \alpha \left(1 - \sqrt{\frac{1-\sin^2 \alpha}{n^2-\sin^2 \alpha}}\right)$$

Where $n$ is the refractive index of the glass with respect to air, measured as 1.52, and $d$ is the thickness of the plate. The glass plate was mounted on a large piece of cork which had been centered on a protractor. Angles were read to better than 0.5°. By rotating the glass plate up to 70° in each direction, displacements up to 2.0 mm. were obtained. The results of these measurements are given in FIG. 2. They indicate that the displacements were large enough to reduce M nearly to unity. The results shown in FIG. 2 were adequately reproducible.

Thus, the data shown in FIG. 2 indicates that the maximum multiplication factor occurs when both beams are colinear and decreases as the centers of each spot were linearly displaced from each other.

Another consideration in the utilization of the multiplication effect for beam alignment or beam tracking was the possible angular dependence. Experiments were conducted in which the effect of the angle of incidence on the multiplication factor was examined. In these experiments it was necessary to insure that only an angular displacement of one of the light spots was taking place. To accomplish this the following experimental arrangement was constructed.

In order to insure that only the angle of incidence was changing, i.e. no linear displacement of either light spot was occurring, a General Electric diffractometer table; containing a goniometer which could rotate through 180°, was used. Its axis of rotation could be very precisely located. The geometry of the experiment is presented in FIG. 3. Two monochromators were used to supply the incident beams. One was mounted on the fixed portion of the table, while the other was mounted on the goniometer. Light spots were produced by using a microscope objective lens and eyepiece combination. The area of each spot thus produced was very small compared to the surface area of the photoconductor. The sample mount was placed about 25 cm. above the center of the table with the vertical axis of the table running precisely along the plane of the cadmium sulfide surface. The effect of moving the goniometer by an angle $\theta$ was to rotate the sample mount by $\theta/2$ and the moving monochromator by $\theta$, producing $\alpha_L = \alpha_R = \theta/2$. ($\alpha_L$ is defined as the angle between the beam from the fixed monochromator and the plane normal to the sample, and $\alpha_R$ refers to the angle between the moving monochromator and the plane normal to the sample.) A frosted glass was substituted for the CdS for the purpose of beam alignment and the spots from the two monochromators were made coincident for all values of $\theta$. This showed that the sample was truly on axis and the beams were truly radial. The approximate equality of $\alpha_L$ and $\alpha_R$ was established by setting the goniometer at zero ($\alpha_R = 0$) and visually setting $\alpha_L = 0$.

First of all various wavelength combinations were tried in order to determine a set which gave a reasonable multiplication factor. Multiplication factors of 18.9 and 46.1 respectively were obtained when the combinations $\lambda_L = 5200$ A., $\lambda_R = 5800$ A., and $\lambda_L = \lambda_R = 5800$ A. were used at $\alpha_L = \alpha_R \cong 0$. The results of varying the angle of incidence are tabulated in Tables 1–A and 1–B.

An examination of the results in each of these tables shows that there is no dependence of the multiplication effect on the angle of incidence. The small decrease in the M factor noted in Table 1–A can be explained by a small effect on the angle of incidence. The small decrease in the effect in Table 1–B makes this explanation more probable than one based on a true angle effect.

In another example the surface of the photoconductor was displaced from the axis of rotation by placing a spacer between the photocell holder and the sample mount. The results of this experiment are tabulated in Table 1–C. It can be seen from this table that the rate of decrease of M with angle is much larger than in the results presented in the two preceding tables. This is to be expected with a linear displacement of the two light spots, and confirms the explanation of the Table 1–A results given in the previous paragraph.

TABLE 1-A.—SEE FIGURE 3

[Effect of beam angle on M]

$i_L$ = photocurrent from left monochromator ($\lambda_L$) alone.
$i_R$ = photocurrent from right monochromator ($\alpha_R$) alone.
$i_T$ = total photocurrent produced when photocell is simultaneously illuminated by both monochromators.
M = multiplication factor.
$\lambda_L$ = 5,200 A.   $\lambda_R$ = 5800 A. ×10⁶ (amps)   V = 1.5 volts.

| Angle of incidence (degrees) ($\alpha_L = \alpha_R$): | $i_L$ | $i_R$ | $i_T$ | M |
|---|---|---|---|---|
| 0 | .01 | 7.91 | 150 | 18.9 |
| 2.5 | .01 | 7.9 | 145 | 18.3 |
| 5.0 | .01 | 7.9 | 145 | 18.3 |
| 7.5 | .01 | 8.3 | 145 | 17.5 |
| 10.0 | .01 | 8.2 | 140 | 17.1 |
| 12.5 | .01 | 8.1 | 138 | 16.8 |
| 15.0 | .01 | 7.8 | 129 | 16.5 |
| 17.5 | .01 | 7.6 | 120 | 15.8 |
| 20.0 | .01 | 7.7 | 115 | 14.3 |
| 22.5 | .01 | 7.7 | 108 | 14.0 |
| 25.0 | .01 | 7.4 | 92 | 12.4 |
| 27.5 | .01 | 6.5 | 88 | 13.5 |

TABLE 1-B $\lambda_L = \lambda_R = 5,800$ A.   V = 1.5 volts × 10⁶ (amps).

| Angle of incidence (degrees) ($\alpha_L = \alpha_R$): | $i_L$ | $i_R$ | $i_T$ | M |
|---|---|---|---|---|
| 0 | 1.70 | 6.55 | 380 | 46.1 |
| 2.5 | 1.70 | 6.55 | 380 | 46.2 |
| 5.0 | 1.40 | 6.60 | 370 | 44.6 |
| 10 | 1.35 | 6.50 | 360 | 46.8 |
| 15 | 1.45 | 5.70 | 330 | 46.2 |
| 20 | 1.50 | 5.60 | 300 | 42.6 |
| 25 | 1.50 | 4.80 | 275 | 43.7 |
| 0 | 1.60 | 6.80 | 375 | 45.2 |

TABLE 1-C $\lambda_L = 5,200$ A.   $\lambda_R = 5,800$ A.   V = 1.5 volts.

| Angle of incidence (degrees) ($\alpha_L = \alpha_R$): | $i_L$ | $i_R$ | $i_T$ | M |
|---|---|---|---|---|
| 0 | 0.01 | 10.9 | 185 | 17.0 |
| 2.5 | 0.01 | 13.9 | 119 | 8.6 |
| 5.0 | 0.01 | 13.9 | 102 | 7.3 |
| 7.5 | 0.01 | 13.4 | 81 | 6.0 |
| 10.0 | 0.01 | 12.8 | 70 | 5.5 |
| 12.5 | 0.01 | 11.8 | 58.4 | 5.0 |
| 15.0 | 0.01 | 11.2 | 51 | 4.6 |
| 17.5 | 0.01 | 10.9 | 44.5 | 4.1 |
| 20.0 | 0.01 | 10.4 | 39.9 | 3.8 |
| 22.5 | 0.01 | 10.4 | 34.9 | 3.4 |
| 25.0 | 0.01 | 8.9 | 31.9 | 3.6 |
| 27.5 | 0.01 | 7.0 | 24.4 | 3.5 |

On the basis of the results presented in the foregoing tables it can be concluded that the multiplication effect is independent of the angle of incidence of the respective light beams when a polycrystalline CdS cell is used. This means that it is not necessary that the two beams be co-linear.

The foregoing concept is carried out into practice in the arrangement shown in FIG. 5 depicting a movable optical beam source, and the beam tracking device.

Here is shown a master unit 37 and a follower unit 39. The master unit has a signal beam source 41 mounted on a carriage 43 and moved along a screw drive 45 by means of a hand crank 47. Beam source 41 produces a beam 49 which will hit a cell 51 on the follower unit 39. Cell 51 is also mounted on a carriage 53 moved by a screw drive 55 by means of a motor 57. The output of cell 51 servos back to an electronics circuit 59 which in turn drives motor 57.

Let the direction of the optical beam be the X-direction and let the normal to this in the plane of the figure be the Y-direction. Both the beam source and the optical receiver are mounted on tracks and move in the Y-direction. During normal operation, when the beam source is moved a given distance along Y, the optical receiver will automatically move an equal distance along Y.

This constitutes a servomechanism with one degree of freedom. Extension to a two-dimensional tracking capability can be accomplished by straightforward means.

FIG. 5 gives a detailed view of the optical apparatus. The signal beam source 41 (master unit) contains a 6 volt auto headlight lamp 61 in a black box 63. A pinhole interference filter 65 (5120 A.) and lens 67 produce a nearly parallel, horizontal beam 44 which is directed towards the follow unit 39. The entire master unit is manually cranked along the carriage on which it is mounted.

The follower unit contains the CdS photodetector 17 on which spots are produced from the impinging light beams. The beam from the master unit is focused by a camera lens on the front of the cell; the beam from the 6 volt lamp (bias beam) attached to the follower unit 39 is projected on the back of the cell after passing through an interference filter 75 (5330 A.), a mirror galvanometer 29a whose null position is at a 45° angle to the X and Y directions and a lens 35. The follower unit 39 is moved along the carriage by the central screw 55 which is driven by the servo motor 57 through a gear 69. This unit also contains a preamplifier for the photocell signal.

When the signal beam and bias beam illuminate the CdS cell from opposite sides in a co-linear and concurrent manner, maximum multiplication occurs and the CdS cell photocurrent output is at a maximum. However, if either beam departs from the mutually aligned position, the photocurrent falls rapidly.

The servo motor is attached to the follower carriage 53 and is driven by the error signal emanating from the control unit.

In order to achieve tracking of the signal beam by the receiver, the photocurrent variation just described must be converted into an appropriate error signal function giving both magnitude and sense of the misalignment of the beams. This is accomplished by the following technique.

The bias beam source is a tungsten lamp which transmits through two pinholes 71 and 73 (FIG. 6) and a narrow band filter 75 (transmission peak at 5200 A.). By means of a moving mirror 29a and a lens, the point of incidence of the bias beam on the CdS cell is made to vary between two selected positions, as shown in FIGS. 6a and 6b. The two positions $y_1$ and $y_2$ are separated by approximately the beam diameter, and the displacement occurs in the Y-direction (i.e., direction of travel).

When the receiver is aligned with the signal beam, the bias beam positions are equally displaced from the signal beam axis, giving equal photocurrent outputs. When the signal beam is offset to the right, in FIG. 6a, the $y_1$ output will exceed the $y_2$ output; conversely when the signal beam is displaced to the left, the $y_2$ output will exceed the $y_1$ output. The desired error signal function can therefore be devised by comparing the photocurrent output wave with the bias beam switching wave in a phase detector.

To provide as rapid tracking as possible, a high bias beam switching rate is essential. In the present instrumentation, the CdS cell response time imposes an upper limit of about 2.0 c.p.s. The moving mirror is actuated by an electromagnet and can operate to about 10 c.p.s.

FIG. 7 shows the complete beam tracking device 77. The servo input error signal is provided by a phase detector 79 which compares the amplified output of the CdS cell with the bias beam switching wave. The servo motor 57 drives the receiver carriage 53 to the position providing minimum error signal, corresponding to the condition of alignment of signal beam and bias beam; hence it aligns the receiver with the signal beam.

The bias beam source 52 is disposed on the carriage adjacent moving mirror 29a. The mirror is oscillated by a core and coil arrangement 81, where the opposite ends of a coil are excited by a 2 Hertz square wave generator forcing the core to move up and back within the coil. The mirror which is pivoted is attached to the core and thus will oscillate the mirror at this rate. With beam 82 from light source 52, a 2.0 c.p.s. signal is supplied to the galvanometer mirror from the 2.0 c.p.s. timing oscillator and the mirror drive circuit. As a result, the spot falling on the back of the photocell 17a is displaced to either side of the null spot with that frequency. The difference in photocurrent then indicates $dm/dY$, which is zero when M is a maximum, i.e., when the front spot and rear null position coincide. (It is also zero when $M=1$ and "tracking has been lost".) Photocell 17a includes a preamplifier. The output signal is fed to a signal amplifier 83 which accepts the output signal from the preamplifier, amplifies it in a signal voltage amplifier, and compares it in phase detector 6a with the 2.0 c.p.s. reference signal. The difference in current between the two signals determines the polarity and level of the error signal. The phase detector 6a amplifies the error signal amplifier and uses the amplified signal to drive the servo motor 57.

In practice, instead of the moving coil arrangement 81 shown in the drawing, an arrangement such as described in the E. O. Collen U.S. Pat. No. 3,156,759 may be used.

For the purpose of giving those skilled in the art a better understanding of the invention, the following illustrative examples are given:

The optical beam follower described above was assembled and successfully operated. A number of performance tests were conducted on it. The results are given below:

(A) Tracking speed

When the master unit of the beam follower is moved too fast, tracking is lost. It is therefore meaningful to establish the maximum tracking rate of the unit. Since the master and follower unit move in parallel, the maximum displacement rate (without tracking loss) is the same for both. The actual displacement rate of the light spot on the photoconductor surface is obtained by multiplying the carriage displacement rate by the distance ratio:

(lens to cell)/(lamp to lens)

In the beam follower this ratio is 1:6.

A panel of 3 experimentalists was selected to acquire skill in moving the master unit as rapidly as possible without tracking loss. A 5 cm. course was selected and it was noted that the time needed to cover this course decreased as experience increased. Eventually, minimum times were obtained as follows:

Direction 1 (increasing number on scale): 40.0 sec
Direction 2 (decreasing number on scale): 39.5 sec It is concluded that maximum tracing speed is at least 0.125 cm./sec. The corresponding velocity of the image on the cell is 0.02 cm./sec. (0.002 radian/sec).

(B) Tracking reproducibility

Millimeter scales with verniers are attached to the carriages of both the master and the follower units. The difference in reading between the two units has a "constant" and a random component. The "constant" component is set during the initial alignment procedure. It can be changed by adjusting the lenses of the optical system so as to change the imaging geometry of the two light spots, but does not vary between adjustments. It has only trivial importance. The random component includes random error of the beam follower device. It also includes random error in positioning the master unit and (if different positions are compared) inequalities of the two scales.

Table 2 shows the results of an experiment designed to measure the random error. The master unit was set at a position and the position of the follower was read after 10 seconds had elapsed. The first part of the table shows the readings when different master positions were set in the order indicated. The second part shows the readings when the same position was approached alternately in either direction. The indicated errors are one standard deviation.

Since the nominal precision of reading and positioning was only 0.1 mm., the standard error of 0.07 to 0.08 mm. obtained by this procedure would be a reasonable estimate of the master positioning error alone. It is therefore definitely an upper limit for the inherent error of the beam follower, which may actually be considerably lower.

TABLE 2.—BEAM FOLLOWER ERROR

| a. Master position (cm.) | Follower position (cm.) | Direction |
| --- | --- | --- |
| 12.00 | 12.07 | 2 |
| 11.00 | 11.07 | 2 |
| 10.00 | 10.07 | 2 |
| 11.00 | 11.05 | 1 |
| 12.00 | 12.06 | 1 |
| 13.00 | 13.07 | 1 |
| 14.00 | 14.06 | 1 |
| 15.00 | 15.06 | 1 |
| 16.00 | 16.07 | 1 |
| 17.00 | 17.06 | 1 |
| 17.00 | 17.07 | 2 |
| 16.00 | 16.06 | 2 |
| 15.00 | 15.07 | 2 |
| 14.00 | 14.07 | 2 |
| 13.00 | 13.08 | 2 |

Average difference 0.066±0.008 cm.

| b. Master position 13.00 cm.—Direction 1 | Follower position shown—Direction 2 |
| --- | --- |
| 13.06 | 13.08 |
| 13.07 | 13.08 |
| 13.07 | 13.08 |
| 13.07 | 13.08 |
| 13.08 | 13.08 |

Average 13.075±0.007 cm.

(C) Power requirement

In order to measure the power requirement of the beam follower under normal tracking conditions, the incident light beam was allowed to impinge on a calibrated Eppley bolometer. No deflection was observed, so that it was necessary to remove the interference filter (512 m$\mu$). When this was done, it was found that the light spot induced a deflection of 6.4±2.2 microvolts above background. The entire beam was contained in the sensitive area of the bolometer. The bolometer was calibrated to yield 0.058 microvolt per microwatt. From the absorption spectrum of the interference filter and the color temperature of the lamp (2840° K.), it was determined that 0.066 percent of the lamp was passed by the filter. The operating light flux was therefore:

$$\frac{6.4}{0.058} \times 6.6 \times 10^{-4} = 7.3 \times 10^{-2} \text{ microwatts}$$

or $7.3 \times 10^{-8}$ watts.

A series of neutral density filters were then introduced into the beam. It was found that a 1.2 density filter, corresponding to 16-fold attenuation, was compatible with tracking, but that a 1.5 filter, corresponding to 32-fold attenuation, inhibited tracking. The minimum power for tracking is therefore:

$$\frac{1}{16} \times 7.3 \times 10^{-8} = 4.5 \times 10^{-9} \text{ watts}$$

Possible applications of the alignment device are space-to-ground, ground-to-space, or space-to-space. In each case a beacon at first station illuminates a second station, moving with respect to the first station. A follower device on the second station keeps a receiver aligned with the beacon by turning it in consonance with the apparent angular motion of the first station as seen from its second station. A further possible application is when the beacon and follower are at the same station, and a moving object with a specularly reflecting surface is followed by tracking the beacon reflection.

As one possible use, the case of a beacon located on a communication satellite at a distance $d$ from a ground station is assumed. Its tangential velocity with respect to station is V. The beacon is a laser beam (continuous) of power P (continuous) of power P contained in a cone of angle $\alpha$. Since $\alpha \ll 1$, the solid angle $\Omega$ is given by $$\Omega = \alpha^2 \pi / 4$$

At the ground station the beam is intercepted by a lens or reflector of area A and focal length $f$ which projects it on the surface of a photoconductor. Imposing the restriction $A \leq f^2$ for a practical optical system. The velocity of motion of the beacon's image on the cell is $v$ and is given by $$v = Vf/d$$

The power per unit area at the receiver is $P/\Omega d^2$, and

The power $p$ concentrated at the image is $P = 4AP\alpha^2 d^2 \pi$.

The minimum power required for the beacon is given by taking $A = f^2$:

$$P = \frac{p\alpha^2 d^2 \pi}{4f^2} = \frac{p\alpha^2 d^2 V^2 \pi}{4d^2 v^2} = \frac{p\alpha^2 V^2 \pi}{4v^2}$$

Note that the distance $d$ cancels out.

Thus, there has been measured the maximum velocity of translation of the master unit as 0.125 cm./sec. Since the distance from the pinhole in the master to the lens is 60 cm. and the distance from lens to cell is 10 cm., the corresponding value for $v$ is:

$$v = 0.02 \text{ cm./sec. } (0.002 \text{ radian/sec.})$$

There has also been measured the minimum power input $p$ required for tracking as:

$$p - 4 \times 10^{-9} \text{ watts}$$

It is also possible to assume the following:

$d = 10^9$ cm. (10,000 km., or about 6000 miles)
$V = 10^6$ cm./sec. (6 miles/sec.)
$\alpha = 10^{-3}$ (1 milliradian, a practical value for lasers)

There is then obtained:

$$f = \frac{vd}{V} = \frac{2 \times 10^{-2} \times 10^9}{10^6} = 20 \text{ cm.}$$

$$p = \frac{4 \times 10^{-9} \times 10^{-6} \times 10^{12} \times 0.78}{4 \times 10^{-4}} = 8 \text{ watts}$$

The alignment link thus requires a parabolic reflector of 8-inch focal length and about 9-inch diameter, and an 8-watt CW laser. The former is within the stage of the art; the latter cannot at present be obtained in a visible wavelength. However, it should be noted that an improvement in collimation of the laser to 0.1 milliradian would reduce the required power to 0.08 watt. These numbers do not take account of losses due to transmission through the atmosphere and the inefficiency of the optical system.

It is anticipated that these alignment devices will work in pairs since it is necessary to keep the laser beam from one station aligned in order to activate the device at the other station.

The accuracy of alignment has also been measured. In our beam follower, the standard deviation of the position of the follower for a given position of the master was $7 \times 10^{-3}$ cm. (0.07 mm.). This includes the random error in the manual positioning of the master; the correct value may be less. This may be taken as the standard deviation of the null position of the image on the photoconductor. Since the focal length of the lens was 10 cm., this deviation corresponds to 0.7 milliradian. This is less than the assumed value of $\alpha$ and it is therefore possible to use this device to train a laser beacon on the other station. This indicates that a paired alignment device arrangement is feasible.

It is to be observed therefore that the present invention provides for a beam tracking device. The device includes a receiver and may include optical means for gathering and focusing energy as a beam. The focused energy beam is directed on to a flat photocell disposed to receive the energy beam on one side thereof and provide an output over an output line. A scanning mirror assembly is disposed for focusing and scanning the other side of said flat photocell and includes means for moving the mirror for scanning. An internal beam is disposed in cooperative relationship with the scanning mirror so that the beam from this source is focused on the other side of the photocell. Connected to the output line of the photocell is a servo mechanism having detection means to detect the coincidence of said focused energy and said internally generated beam said detection being accomplished because of the multiplication effect over the output line resulting from the coincidence of these two beams. The servo mechanism also includes moving means to move the receiver so that the two beams coincide.

While the present invention has been described in preferred embodiments, it will be obvious to those skilled in the art that various modifications can be made therein within the scope of the invention, and it is intended that the appended claims cover all such modifications.

What is claimed is:
1. A beam tracking device, comprising in combination,
   (a) receiver means for gathering energy as a beam;
   (b) a flat photocell disposed to receive said gathered energy beam as a spot on one side thereof including cell electrical bias means and an output line;
   (c) an internal beam source in said device producing a beam which is to be focused on the other side of said photocell as a spot;
   (d) scanning means including a mirror and means for moving said mirror in a scan pattern disposed for moving said internal beam spot on said other side of the photocell in the scan pattern; and,
   (e) servo means connected to said output line including means to detect the coincidence of said energy beam spot and said internal beam spot by the current multiplication effect output caused thereby including moving means to move said device so that said internal beam spot seeks to maintain coincidence with said energy beam spot.

2. A device as claimed in claim 1 wherein said receiver means includes an optics section for focusing said energy on said photocell.

3. A device as claimed in claim 1 wherein said photocell is a cadmium sulfide cell.

References Cited
UNITED STATES PATENTS 3,330,178    7/1967    Timson _____ 356—172 X JAMES W. LAWRENCE, Primary Examiner C. R. CAMPBELL, Assistant Examiner U.S. Cl. X.R.

250—211, 220; 356—123, 172, 230